United States Patent
Bergeron et al.

(10) Patent No.: US 8,233,109 B2
(45) Date of Patent: Jul. 31, 2012

(54) PORTABLE COMPUTER DISPLAY HOUSING

(75) Inventors: Kathleen A. Bergeron, Los Gatos, CA (US); Laura DeForest, Sunnyvale, CA (US); Kevin S. Fetterman, Los Altos, CA (US); Michelle Goldberg, Sunnyvale, CA (US); Timothy S. Hibbard, Menlo Park, CA (US); Chung-Tse Huang, Fongshan (TW); William F. Leggett, San Francisco, CA (US); Zachary Joseph Zeliff, Taipei (TW)

(73) Assignee: Apple Inc., Cupertino, CA (US)

( * ) Notice: Subject to any disclaimer, the term of this patent is extended or adjusted under 35 U.S.C. 154(b) by 350 days.

(21) Appl. No.: 12/580,914

(22) Filed: Oct. 16, 2009

(65) Prior Publication Data

US 2011/0090712 A1  Apr. 21, 2011

(51) Int. Cl.
 *G02F 1/1333* (2006.01)
(52) U.S. Cl. .......................... 349/58; 349/60
(58) Field of Classification Search ............ 349/58, 349/60
See application file for complete search history.

(56) References Cited

U.S. PATENT DOCUMENTS

| | | |
|---|---|---|
| 2,964,887 A | 12/1960 | Orozco |
| 3,517,466 A | 6/1970 | Bouvier |
| 4,766,746 A | 8/1988 | Henderson et al. |
| 5,237,486 A | 8/1993 | LaPointe et al. |
| 5,531,950 A | 7/1996 | Kimura et al. |
| 5,606,438 A | 2/1997 | Margalit et al. |
| 5,611,517 A | 3/1997 | Saadi et al. |
| 5,795,430 A | 8/1998 | Beeteson et al. |
| 5,828,341 A | 10/1998 | Delamater |
| 5,881,103 A | 3/1999 | Wong et al. |
| 6,014,080 A | 1/2000 | Layson, Jr. |
| 6,122,167 A | 9/2000 | Smith et al. |
| 6,151,912 A | 11/2000 | Bullister |
| 6,179,122 B1 | 1/2001 | Moncrief et al. |
| 6,532,152 B1 | 3/2003 | White et al. |
| 6,542,384 B1 | 4/2003 | Radu et al. |
| 6,791,465 B2 | 9/2004 | Blagin et al. |
| 6,846,228 B2 | 1/2005 | Lin |

(Continued)

FOREIGN PATENT DOCUMENTS

EP  0 683 026 B1  3/2001

(Continued)

OTHER PUBLICATIONS

Block, "MacBook Air Review", http://www.engadget.com/2008/01/25/Marcbook-air-review, Jan. 25, 2008.

(Continued)

*Primary Examiner* — James Dudek

(74) *Attorney, Agent, or Firm* — Womble Carlyle Sandridge & Rice LLP

(57) ABSTRACT

A display housing for a portable computing device that utilizes a plastic cover bonded to an internal metal frame is described. To account for thermal cycling issues and in particular to prevent bond slippage, multiple types of adhesives are employed to join the metal frame and the plastic cover. In particular, a very high bond (VHB) adhesive material is used in certain areas to bond the metal inner frame to the plastic cover and a liquid adhesive is used in other areas. The plastic cover can be translucent to light. A method of coating the plastic cover to block light, such as from a backlight used for the display, is described.

20 Claims, 6 Drawing Sheets

U.S. PATENT DOCUMENTS

| | | | |
|---|---|---|---|
| 6,853,336 B2 | 2/2005 | Asano et al. | |
| 6,876,543 B2 | 4/2005 | Mockridge et al. | |
| 6,967,833 B2 | 11/2005 | Boykin et al. | |
| 6,999,826 B1 | 2/2006 | Zhou et al. | |
| 7,330,122 B2 | 2/2008 | Derrick et al. | |
| 7,342,792 B2 | 3/2008 | Kim et al. | |
| 7,369,191 B2 | 5/2008 | Okamoto et al. | |
| 7,522,889 B2 | 4/2009 | Wulff et al. | |
| 7,535,547 B2 | 5/2009 | Tannas, Jr. | |
| 7,545,574 B2 | 6/2009 | Park et al. | |
| 2002/0037686 A1 | 3/2002 | Brown et al. | |
| 2002/0048148 A1 | 4/2002 | Horiuchi et al. | |
| 2003/0197111 A1 | 10/2003 | Morimoto et al. | |
| 2005/0069667 A1 | 3/2005 | Wacker | |
| 2006/0082956 A1 | 4/2006 | Garel et al. | |
| 2006/0268528 A1 | 11/2006 | Zadesky et al. | |
| 2007/0165373 A1 | 7/2007 | Merz et al. | |
| 2008/0026614 A1 | 1/2008 | Emerson et al. | |
| 2008/0237477 A1 | 10/2008 | Hoggatt et al. | |
| 2009/0088055 A1 | 4/2009 | Silva et al. | |
| 2009/0146279 A1 | 6/2009 | Griffin | |
| 2009/0175001 A1 | 7/2009 | Mathew et al. | |
| 2009/0183819 A1 | 7/2009 | Matsuhira | |
| 2010/0103641 A1* | 4/2010 | Cho et al. | |

FOREIGN PATENT DOCUMENTS

| | | |
|---|---|---|
| EP | 0 911 717 B1 | 3/2003 |
| EP | 1 621 967 | 2/2006 |
| JP | 2003-174492 | 6/2003 |
| WO | WO 2009/126480 | 10/2009 |

OTHER PUBLICATIONS

PowerBook G4 (15-Inch FW 800): Sound Specifications, http://support.apple.com/kb/TA27151?viewlocale=en US, Jan. 8, 2007.

Int'l Search Report dated May 10, 2011 from Int'l Application No. PCT/US2010/052563.

Written Opinion dated May 10, 2011 from Int'l Application No. PCT/US2010/052563.

Partial Search Report dated Feb. 15, 2011 from Int'l Application No. PCT/US2010/052563.

* cited by examiner

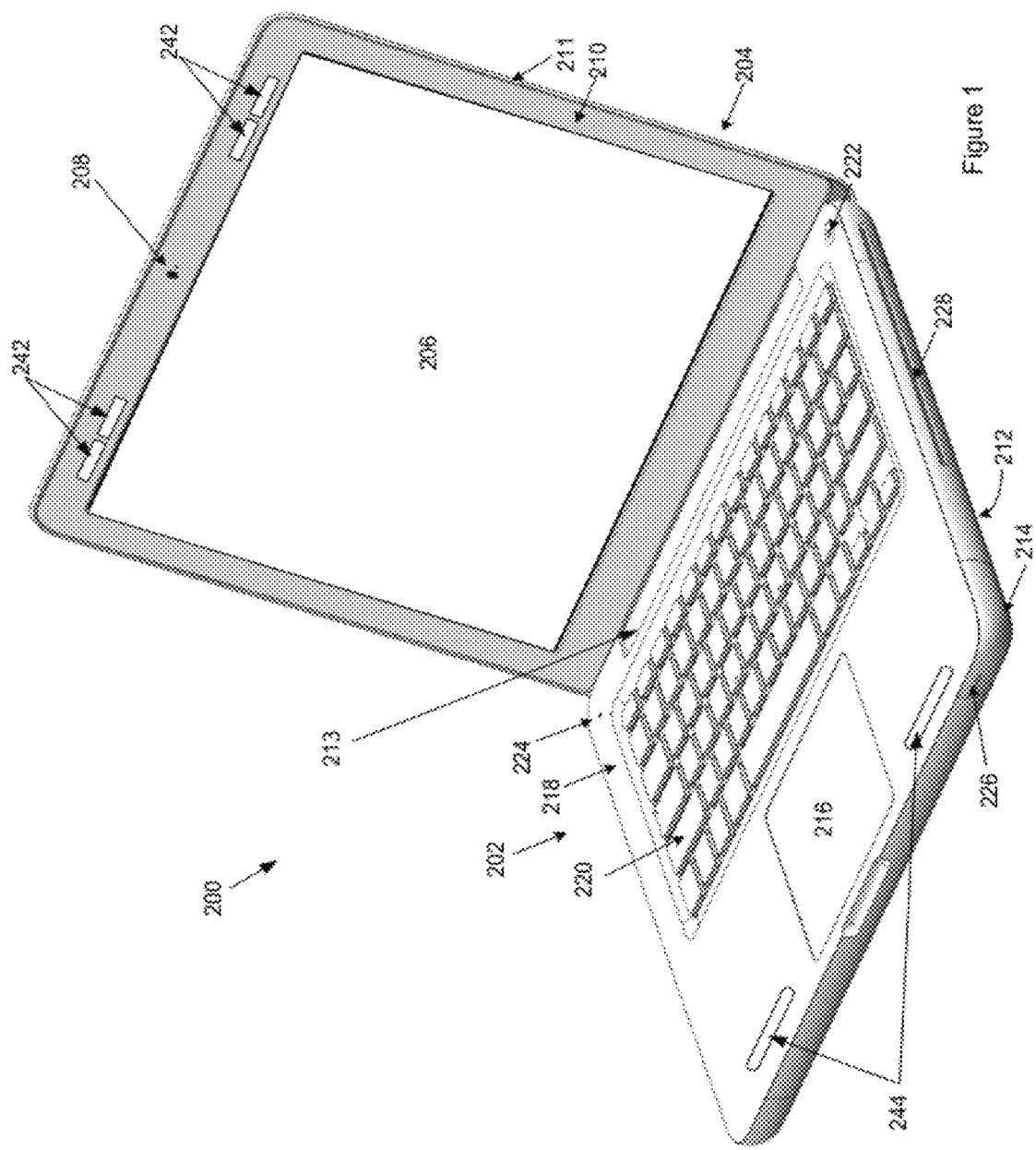

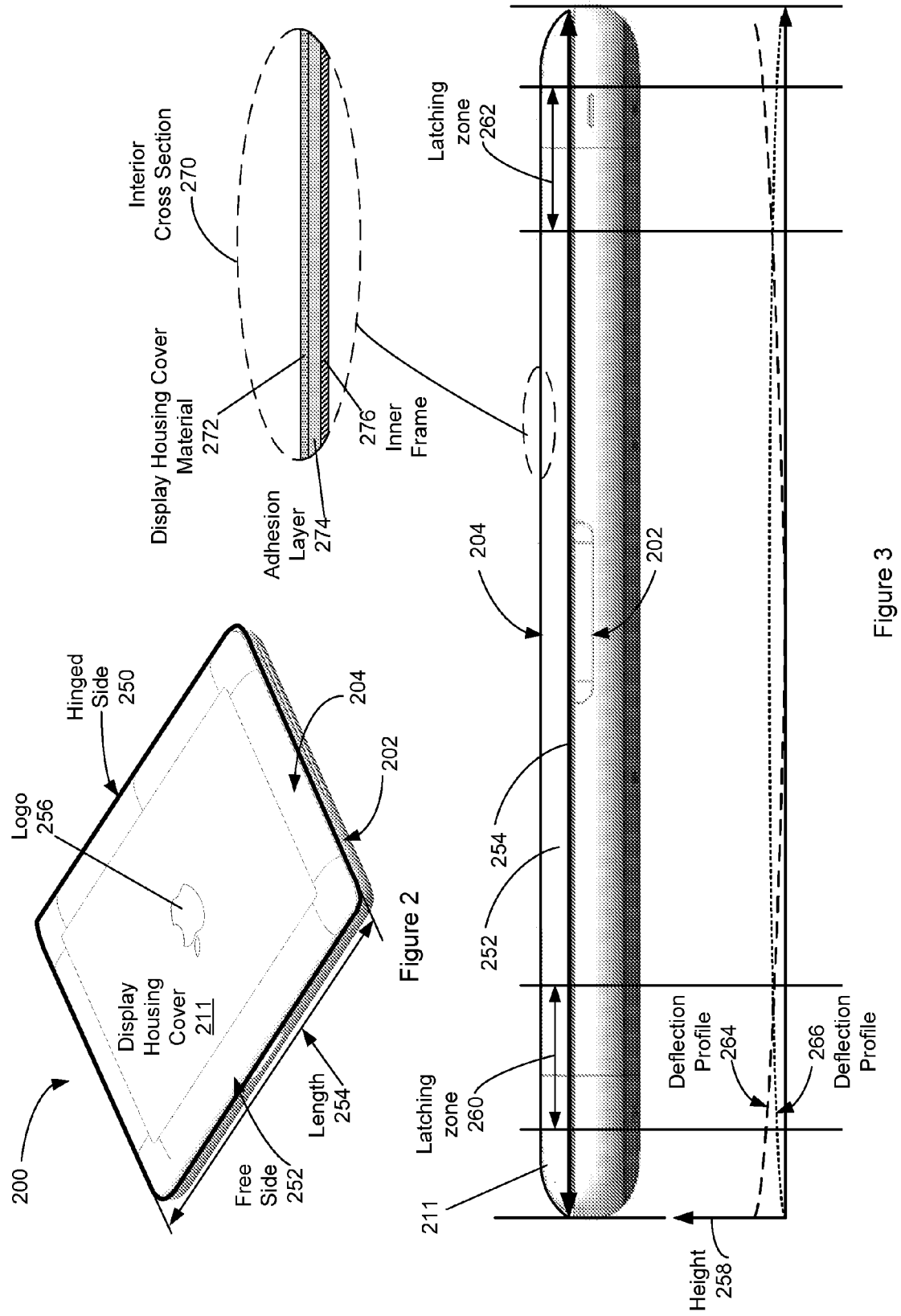

PORTABLE COMPUTER DISPLAY HOUSING

CROSS REFERENCE TO RELATED APPLICATIONS

This patent application is related to and incorporates by reference in their entireties for all purposes the following co-pending patent applications filed concurrently herewith:
(i) U.S. patent application Ser. No. 12/580,922 (APL1P601) entitled "COMPUTER HOUSING" by Raff et al.;
(ii) U.S. patent application Ser. No. 12/580,985 (APL1P603) entitled "PORTABLE COMPUTER ELECTRICAL GROUNDING AND AUDIO SYSTEM ARCHITECTURES" by Thomason et al.;
(iii) U.S. patent application Ser. No. 15/580,946 (APL1P604) entitled "PORTABLE COMPUTER HOUSING" by Casebolt et al.;
(iv) U.S. patent application Ser. No. 12/580,934 (APL1P607) entitled "METHOD AND APPARATUS FOR POLISHING A CURVED EDGE" by Lancaster et al. that takes priority under 35 U.S.C. 119(e) to U.S. Provisional Patent Application Ser. No. 61/249,200 (APL1P605P) entitled "COMPLEX GEOGRAPHICAL EDGE POLISHING" by Johannessen filed Oct. 6, 2009, which is incorporated by reference in its entirety;
(v) U.S. patent application Ser. No. 12/580,881 (APL1P608) entitled "SELF FIXTURING ASSEMBLY TECHNIQUES" by Thompson et al.;
(vi) U.S. patent application Ser. No. 12/580,886 (APL1P612) entitled "PORTABLE COMPUTER DISPLAY HOUSING" by Bergeron et al.;
(vii) U.S. patent application Ser. No. 12/580,927 (APL1P613) entitled "COMPUTER HOUSING" by Raff et al.; and
(viii) U.S. patent application Ser. No. 12/580,976 (APL1P593X1) entitled "BATTERY" by Coish et al., which is a continuation in part of U.S. patent application Ser. No. 12/549,570 (APL1P593), filed Aug. 28, 2009, which is incorporated by reference herein in its entirety.

BACKGROUND OF THE INVENTION

1. Field of the Invention

The described embodiments relate generally to portable computing devices. More particularly, the present embodiments relate to display housings for portable computing devices.

2. Description of the Related Art

A design of a portable computing device can involve complex tradeoffs. A few factors that can be considered in the design process are cosmetic appeal, weight, manufacturability, durability, thermal compatibility and power consumption. A component that is selected on the basis of its positive contribution to one of these design factors can have an adverse impact on one of more other design factors.

One design challenge associated with the portable computing device is the design of the enclosures used to house the various internal components. This design challenge generally arises from a number conflicting design goals that includes the desirability of making the enclosure lighter and thinner, the desirability of making the enclosure stronger and making the enclosure more esthetically pleasing. The lighter enclosures, which typically use thinner plastic structures and fewer fasteners, tend to be more flexible and therefore they have a greater propensity to buckle and bow when used while the stronger and more rigid enclosures, which typically use thicker plastic structures and more fasteners, tend to be thicker and carry more weight. Unfortunately, increased weight can lead to user dissatisfaction while bowing can damage the internal parts. Thus, materials are selected to provide sufficient structural rigidity while meeting weight constraints and providing necessary aesthetic appeal.

Deformation of an enclosure, such as bowing, can result from mechanical loads externally applied to the enclosure. For example, a user can sit-on, step-on or drop the portable computing device which, in each instance, introduces a unique set of mechanical loads that can result in deformation of the enclosure and possibly damage the internal components. Besides mechanical loads, the portable computing device can also experience thermal loads that can result in deformation of the enclosure.

During operation of a portable computing device, the device can experience a range of temperatures. For example, a device left in a car over-night, depending on the location and time of year, can experience temperatures well below freezing. Further, a device left in a car during the day can experience temperatures as high as 65 degrees Celsius. Because of mismatches in thermal properties of materials that are coupled together within the portable computing device, various thermal stresses can be generated during temperature cycling. A device can be potentially damaged or deformed as a result of the thermal stresses.

Therefore, it would be beneficial to provide a housing for a portable computing device that is aesthetically pleasing and lightweight, durable and yet environmentally friendly. It would also be beneficial to provide methods for assembling the portable computing device that meet the above conditions and perform satisfactorily during thermal cycling of the device.

SUMMARY OF THE DESCRIBED EMBODIMENTS

This paper describes various embodiments that relate to systems, methods, and apparatus for enclosures for use in portable computing applications. In one aspect, a display housing that utilizes a plastic cover bonded to an internal metal frame is described. The plastic cover can be bonded to the internal metal frame using various adhesives, such as a liquid adhesive. To account for thermal cycling issues, such as a thermal expansion mismatch between the plastic cover and the metal frame, multiple types of adhesives can be employed. The multiple adhesives can be selected to prevent bond slippage that can produce permanent deformations at higher temperatures. In particular embodiments, a very high bond (VHB) adhesive material can be used in certain areas to bond the metal inner frame to the plastic cover and a liquid adhesive can be used in other areas.

In another aspect, the material used for the plastic cover can be translucent to light. For the display housing, a method of coating the plastic cover that blocks light emitted from a lighting source, such as the backlight for the display, is described. The coating scheme can be applied to only a portion of the plastic cover to block light in certain areas over the surface of the plastic cover while allowing light to be transmitted through the uncoated areas. For example, a logo portion can be left uncovered to provide an appearance of a lighted logo on the plastic cover. A three layer coating scheme can be employed to prevent shadowing effects along the border between uncoated and coated areas.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1 shows a right side front facing perspective view of a portable computing device in an open state.

FIG. 2 shows a perspective view of a portable computing device in a closed configuration.

FIG. 3 is a front view of a portable computing device and a cross section of a portion of the display housing.

DETAILED DESCRIPTION OF SELECTED EMBODIMENTS

Figure 4:
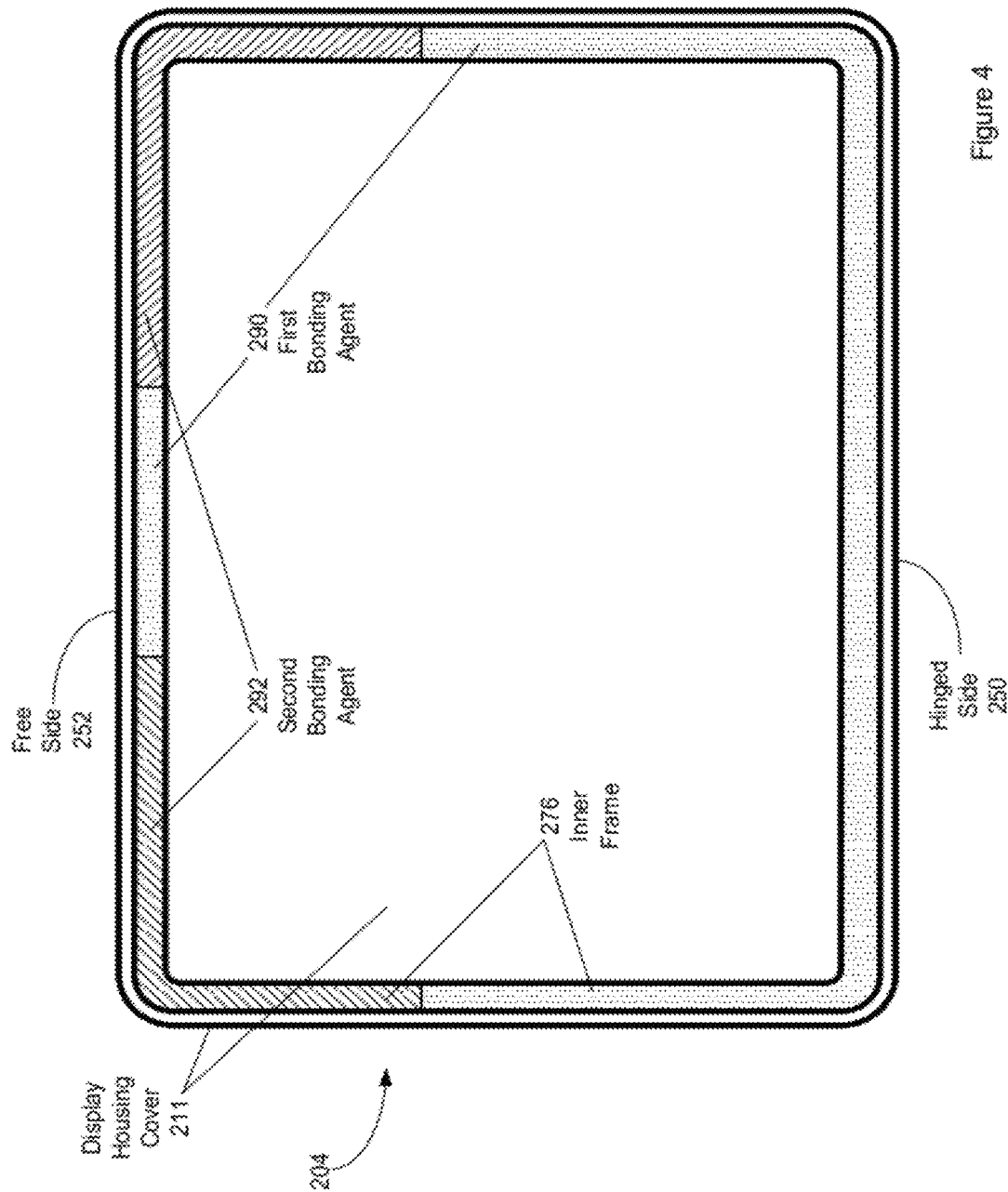
FIG. 4 is a block diagram of a bonding scheme for bonding a display housing cover to an inner frame.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following relates to a multi-part housing suitable for a portable computing device such as a laptop computer, netbook computer, tablet computer, etc and in particular a display housing cover for the laptop computer. A general description of a portable computing device is described with respect to FIG. 1. In particular embodiments, the display housing can have a plastic cover joined to a metallic inner frame. A bonding scheme for joining the cover to the metallic frame that accounts for different thermal expansion rates in the materials is described with respect to FIGS. 2-4. Methods and apparatus for providing an illuminated portion of display housing cover are described with respect to FIGS. 5-6. These and other embodiments of the invention are discussed below with reference to FIGS. 1-6. However, those skilled in the art will readily appreciate that the detailed description given herein with respect to these figures is for explanatory purposes as the invention extends beyond these limited embodiments.

FIG. 1 shows a right side front facing perspective view of portable computing device 200 in an open state. Portable computing device 200 can include body 202 and display housing 204 having display 206. The body can, in turn, include a cosmetic outer layer supported by an inner layer that can both transfer and distribute loads applied to the portable computing device. The outer layer can be formed of lightweight yet durable materials. Such materials can include, for example, blends of poly-carbonate and acrylonitrile butadiene styrene (ABS), or PCABS that exhibit high flow, toughness and heat resistance well suited for portable applications. The inner layer can be formed of metal such as magnesium or magnesium alloy.

Display housing 204 can be moved by a user from a closed position to an open position as shown. Display 206 can display visual content such as a graphical user interface, still images such as photos as well as video media items such as movies. Display 206 can display images using any appropriate technology such as a liquid crystal display (LCD), OLED, etc. Portable computing device 200 can also include image capture device 208 located on display housing 204. Compliant display trim 210 formed of suitable compliant material can be supported by structural components (not shown) within display housing 204 but attached to display housing cover 211 of display housing 204.

Display housing 204 can be coupled to body 202 using a hinge assembly (hidden by clutch barrel 213) that in turn can be connected by way of a load path to structural support layer 212. Body 202 can include a number of user input devices such as touch pad 216 and keyboard 218. Keyboard 218 can include a plurality of key pads 220 each having a symbol imprinted thereon for identifying to a user the key input associated with the particular key pad. Touch pad 216 can be configured to receive a user's finger gesturing.

Body 202 can also include power button 222 arranged to assist the user in turning on and turning off portable computing device 200. Audio input device 224 can be used as a microphone to receive audible input such as speech. Status indictor light (SIL) 226 can be used to provide a user with information. Body 202 can also include openings used for accessing operational circuits mounted within housing 202. For example, disc slot 228 can be used for inserting disc media such as compact discs (CDs) and or digital versatile discs (DVDs).

The display housing 204 includes two sets of magnetic latches 242 above the display 206. The magnetic latches 242 are configured to line up with metal plates 244 on the body 202. When the portable computing device 200 is in a closed configuration, the magnetic latches 242 align with the metal plates 244. A magnetic interaction between the latches 242 and the steel plates 244 generates a force that can help to keep the portable computing device in a closed configuration.

FIG. 2 shows a perspective view of a portable computing device 200 in a closed configuration. As described with respect to FIG. 1, the portable computing device 200 includes a body 202 and a display housing 204. In the closed configured configuration, a display housing cover 211 of the display housing is visible. In this embodiment, the portable computing device 200 includes a hinged side 250 where the body 202 and the display housing 204 are joined. Opposite the hinged side 250 is free side 252 with length 254 of the display housing 204. The free side 252 of the display housing 204 can be moved away from body 202 to expose the display 206 and keyboard 218 as shown in FIG. 1.

FIG. 3 is a front view of a portable computing device 200 and a cross section 270 of a portion of the display housing 204. As is shown in the cross section 270, the display housing cover 211 can be constructed of a display housing material 272, such as a type of plastic. The display housing cover 211 can be primarily cosmetic in nature such that other components provide most of the structural stiffness of the display housing 204. In one embodiment, the display housing cover 211 can be joined to an inner frame 276 for providing structural stiffness. The inner frame 276 can be a metal such as a magnesium alloy.

The display housing cover 211 can be joined to an inner frame, such as 276, using a combination of fasteners (e.g., screws), adhesives or other types of bonding agents. In one embodiment, as shown in the interior cross section 270, the display housing cover material 272 can be joined to the inner frame using primarily an adhesion layer 274. In a particular embodiment, a plastic display housing cover is joined to a metallic inner frame using only adhesion layer and without using fasteners, such as screws. A bonding scheme for joining the display housing cover material 272 to the inner frame 276 including more details about the adhesion layer 276 are described with respect to FIG. 3.

As previously described above in the background section, a portable computing device during operation can be exposed to a wide range of temperatures. For instance, a device left in a car for some users can experience temperatures well below freezing at night while a device left in a car for other users can experience temperatures as high as 65° C. However, during manufacture, the various components of the portable computing device 200 can be assembled at an ambient temperature that is well within the operational ranges that the device 200 can experience. Thus, after a prototype of a device is assembled, it can be thermally cycled at a range of temperatures to determine that it adequately withstands any thermal stresses that are introduced during thermal cycling.

For instance, as an illustration of thermal cycling, to simulate a device left in the car on a hot day, the device can be placed in environment to reach equilibrium with the ambient temperature, such as a temperature of about 15-25° C. to simulate an air-conditioned temperature in the car, then the temperature can be raised over a time period from the air conditioned temperature, to simulate the device sitting on a dashboard of the car in the sun with the air conditioning off, then the device can be allowed to reach equilibrium with some final temperature, such as 45-65° C. If desired, cooling of the device can be simulated, such as the returning the device to an air conditioned temperature. Also, if desired this cycling can be repeated, using the same other cycling conditions (e.g., the device could be taken from a heated condition in a car during a winter to over night temperatures well below freezing). Thus, the range of temperatures above is provided for illustrative purposes only. After a device is exposed to thermal cycling, it can be examined to determine whether any components have been damaged or deformed as a result of thermal stresses introduce during thermal cycling.

Returning to FIG. 3, in a particular embodiment, a plastic display housing cover 211 can be joined to a metallic frame using a liquid adhesive, such as a liquid two-part epoxy where the two parts react when mixed together, and then, the bond can be allowed to cure. During curing, the liquid bond hardens. The liquid adhesive can be selected for cost, environmental friendly-ness and ease of application. In particular embodiments, the thermal expansion coefficient of the display housing material, such as 272, can be greater than the material of the inner frame 276. For instance, in one embodiment, the thermal expansion coefficient of the display housing material is proximately 3 times greater than that of the inner frame.

During design of the display housing 204, a prototype of the display housing cover was joined to the inner frame using a liquid adhesive and exposed to the thermal cycling where an upper operational temperature was simulated. Because the thermal coefficient of the display housing cover material is greater than that the inner frame, on heating the display housing material lengthens faster than the inner frame, this mismatch in lengthening can produce a deflection profile, such as 266, as shown in FIG. 3. The height 258 or amount of deflection along the length 254 of the free side 252 of the portable displaying housing 204 is shown. For deflection profile 266, along the length 254 of the free side 252, the center of the profile 266 tends to deflect more than the corners producing a downward bowing shape. As an example, the maximum height of the deflection at the center can be 1-6 mm. On the hinged side, the hinging mechanism prevents this amount of deflection to occur.

As is describe above, after heating to an upper operational temperature, the device can be allowed to reach an equilibrium temperature and then cooled again. After cooling, a deflection profile 264 was observed for the prototype. In profile 264, the corners are deflected more than the center. As is shown in FIG. 3, one explanation for the profile 264 is that at the higher temperature at which the prototype was tested, the bond formed by the liquid adhesive after curing softens resulting in bond slippage between the inner frame 276 and the display housing cover material 272. The slippage relieves the thermal stresses in the adhesion layer 274 resulting from the unequal expansion of the two materials. After bond slippage occurs, new bond locations are established. Upon cooling, the bond again hardens and the new bond locations cause a profile, such as 264.

The profiles described above are provided for illustrative purposes only. Different profile can be obtained under different testing conditions. For instance, if the bonds of the liquid adhesive are sufficiently softened at high temperatures, then bond slippage can occur as a result of gravitational forces. For instance, the inner frame can slip relative to the display housing cover as a result of a device being left on its side or on a tilted surface. This type of slippage could produce a different deflection profile upon cooling. In particular, the deflection profile could be asymmetric along length 254 of the free side. Another bond slipping mechanism could result from applying a sudden force to the device, such as dropping or jarring the device when the bonds where softened under high temperature conditions.

A profile 264, such as shown in FIG. 3, can be undesirable for cosmetic reasons as after cooling the display housing cover remains warped and does not return to its pre-heated condition. Further, for the magnetic latches, as described with respect to FIG. 1, the profile 264 can reduce the latching integrity of the magnetic latches in latching zones, 260 and 262. The latching integrity of the magnetic latches can be reduced because the magnetic force between the latches and its associated latching plates is reduced exponentially as a function of a distance between the magnetic latches and the latching plates. Thus, the latching integrity can be decreased for profile 264 because upon deflection, the distance between the magnetic latches and the latching plates are increased.

It can be desirable that after a component is heated and cooled, such as the display housing cover 204, that the component returns proximately to its original shape. Further, it can be desirable when a portable computing device, such as 200, temperature is raised that latching integrity is still maintained. A bonding scheme that addresses these needs is described with respect to FIG. 4.

FIG. 4 is a block diagram of a bonding scheme for bonding a display housing cover 211 to an inner frame 276. The display housing cover is a component of the display housing 204. The hinged side 250 and the free side 252 of the display housing cover 204 are indicated in the figure. An inner frame 276 is shown bonded to the inner surface of the display housing cover 211. The inner frame 276 is simplified for illustrative purposes as it can vary in shape and thickness around its perimeter. Further, inner frame can include cutouts and various attachment points.

A bonding scheme including a combination of bonding agents is shown around the perimeter of the inner frame 276. The bonding agents provide an adhesion layer 274 between the inner frame 276 and the display housing cover 211 that joins the two components. In embodiment, two bonding agents can be used at various locations around the perimeter of the inner frame 276. A first bonding agent 290 is represented by the dots while a second bonding agent 292 is represented by the dashed lines.

In a particular embodiment, the first bonding agent can be a two-part epoxy that is applied in a liquid state and then allowed to cure and harden. The second bonding agent 292 can be selected such that at higher operational temperatures for which the portable housing device is tested, the second bonding agent maintains bond integrity. When bond integrity provided by the second bonding agent is maintained between the two materials during thermal cycling, the thermal stress resulting from unequal expansion of the two materials remains in the bond rather being relieved by bond slippage.

The second bonding agent 292 can be applied proximate to the corners of the inner frame on the free side 252 while the first bonding agent is utilized in other areas. On the hinged side, the hinge mechanism prevents or minimizes bond slippage and thus the first bonding agent 290 can be used in this area. Between the two corners on the free side 252, the first bonding agent 290 can be used. The first bonding agent 290 can be used because if at the higher operational temperature, the bond generated from the first bonding agent 290 softens, the bond formed by the second bonding agent 292 stores enough of the thermal stress to minimize bond slippage in the bond formed by the first bonding agent.

The area of the second bonding agent 292 can be selected to prevent bond slippage induced from a selected maximum thermal stress as well as to maintain bond integrity during thermal cycling. In one embodiment, a very high bond, (VHB) doubled side tape can be used as the second bonding agent. VHB tapes for bonding metal to plastic are available from many manufacturers, such as 3M™ (Minneapolis, Minn.). These tapes can be designed to maintain bond integrity for temperatures up to 150° C.

In other embodiments, a single bonding agent can be used to bond the inner frame 276, such as metal frame, to a display cover housing 211, such as plastic housing. For example, in one embodiment, a VHB bond tape can be used around the entire perimeter or a sufficient portion of the perimeter to ensure adequate bonding. In another embodiment, an adhesive applied in a liquid form that maintains its bonds under the thermal stresses experienced by the portable housing cover can be used. Further, when the thermal properties of the inner frame and the display cover materials are more closely matched the thermal stresses can be reduced, and then a single bonding agent, such as an adhesive applied in a liquid form can be used.

A few advantages of using the bonding scheme described with respect to FIG. 4 are as follows. A first advantage can be that the bonding scheme is configured such that upon heating and then subsequent cooling, the display housing cover returns proximately to its original pre-heated shape. A second advantage can be at higher temperatures, along the length of the free side of the display housing cover, the corners of the free side deflect downward relative to the center as opposed to upwards as shown by deflection profiles 264 and 266, respectively in FIG. 3. Thus, even when the display housing cover deflects, latching integrity of the device can be maintained.

Figure 5:
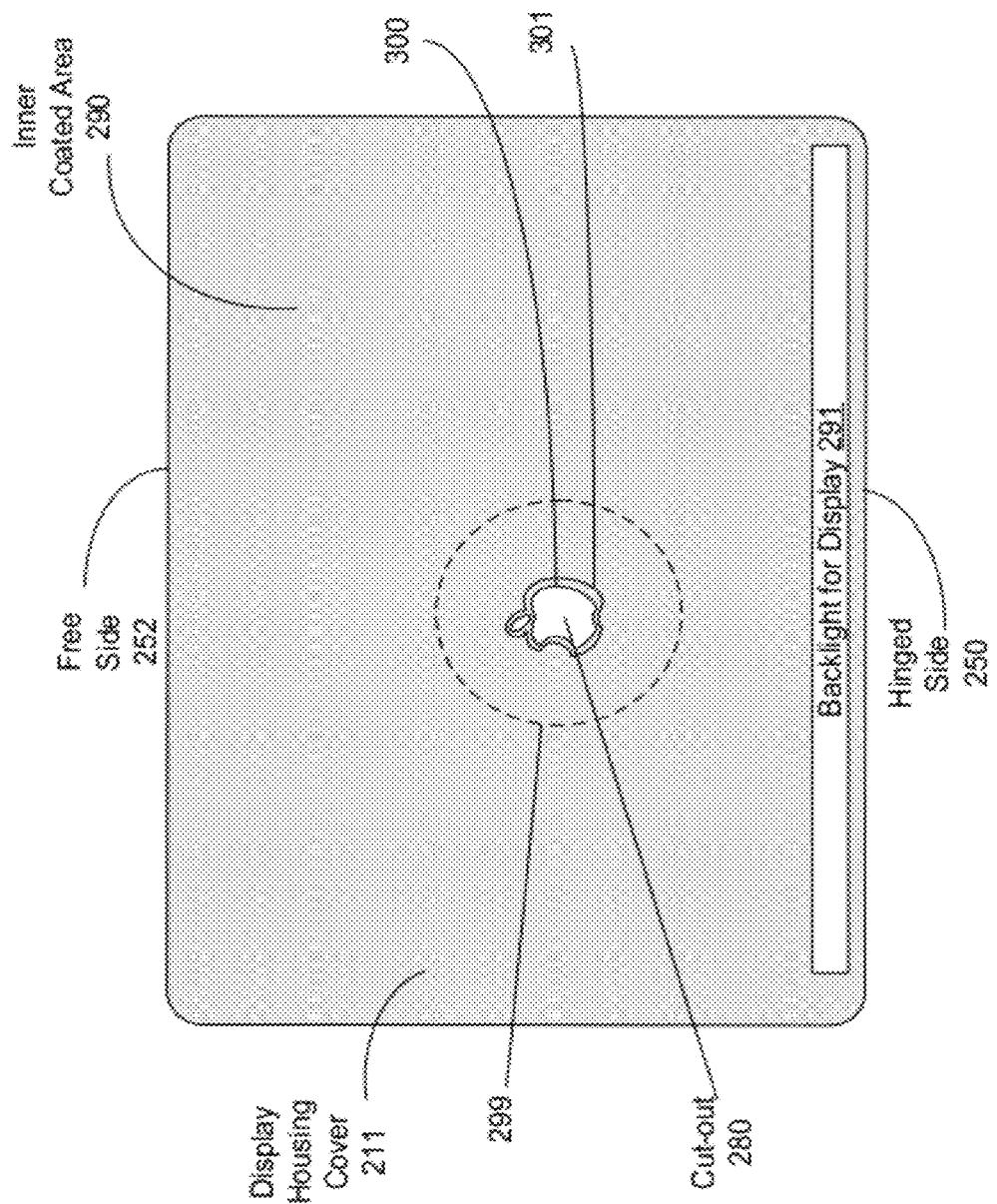
FIG. 5 is a block diagram of a coating scheme for a display housing cover.

FIG. 5 is a block diagram of a coating scheme for a display housing cover 211. In some embodiments, a portion of the display housing cover 211 can be illuminated. For example, it can be desirable to illuminate the region 280, which includes a logo 300. Multiple areas on the display housing cover can be illuminated and the present invention is not limited to a single illumination area such as around the logo. Further, shapes other than a logo can be illuminated.

In one embodiment, the backlight 291 for the display can be used as an illumination source for lighting the logo 300. The backlight 291 can be generated from different lighting mechanisms, such as but not limited to a compact fluorescent bulb, an array of LED's arranged in a line or LED tiles. In other embodiments, an illumination source separate from the backlight 291 can be used. For multiple cut-out areas, multiple illumination sources can be used or a single illumination source, such as the backlight 291, can be employed.

In a particular embodiment, a cut-out 280 is made in the display housing cover 211 in the shape of the logo 300. An area 301 around the cut-out 280 is recessed to form a ledge. The ledge can support an insert or other filler material that is placed in the cut-out area 280. In other embodiments, rather than using a cut-out area, a portion of the display housing cover can be left uncoated. For instance, the uncoated area can be in the shape of a logo 300. When the display housing cover is transmissive to light, the uncoated area can be illuminated by an illumination source, such as the backlight for the display.

The inner surface of the display housing cover 211 can be coated with two layers. First, a white layer is applied and then a second gray layer is applied over the white layer. The paint can be selected for compatibility with the display housing cover material, which as previously described can be plastic, as well as light-blocking characteristics. The two coating layers can be applied to the edges of the cut-out area 280. The first two layers can be applied over some portion of an inner surface of the display housing cover 211, such as but not limited to extending from the edges of the cut-out area 280 to some area near the outer perimeter of the display housing cover (if multiple cut-out areas are used then the first two paint layers can extend around each of the edges of the cut-out areas.) The portion of the display housing cover coated with the first two coating layers is referred to as the inner coated area 290.

A third coating layer can be applied over the first two layers in some region surround the cut-out area. In one embodiment, the third layer is applied in a circular region 299 around the cut-out area 280. The third coating layer can be applied before or after an insert or filler material is applied in the recessed region 301 around the cut-out 280. The third coating layer can be applied to reduce shadowing effects proximate to the logo 300.

Figure 6:
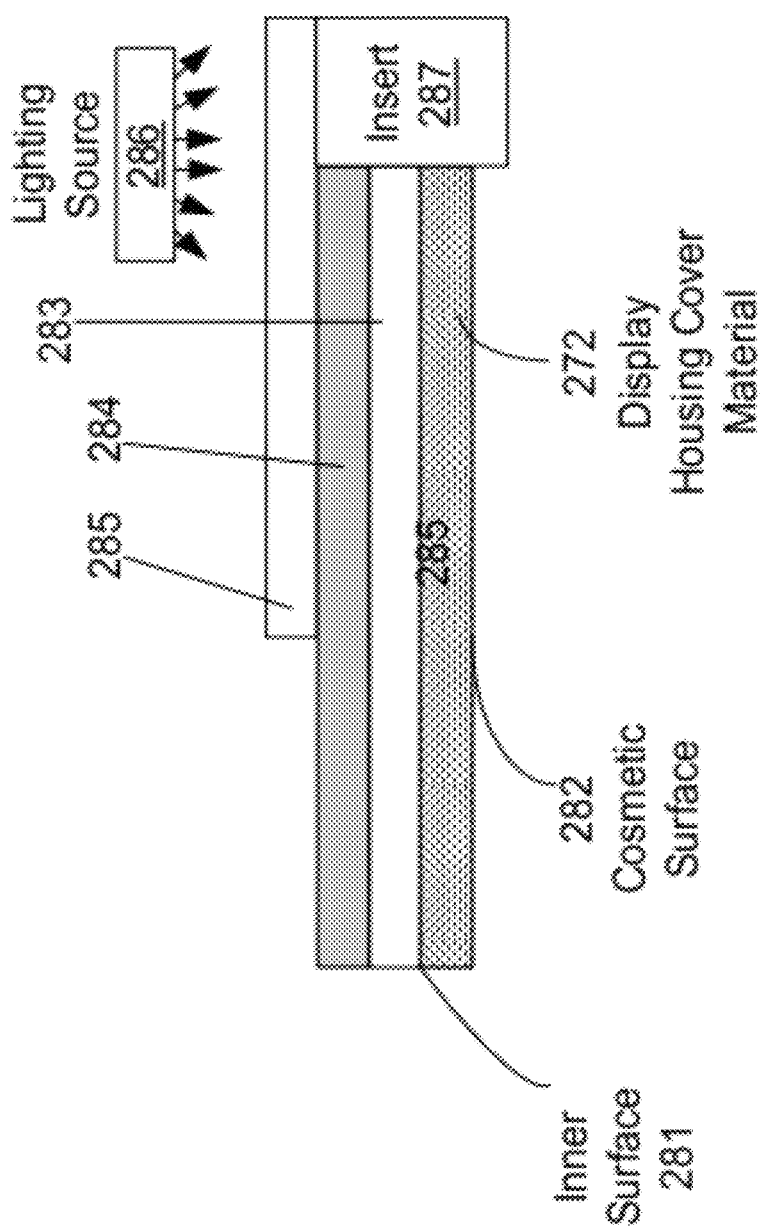
FIG. 6 is a diagram of coating layers for a coating scheme associated with a lighted portion of the display housing cover.

FIG. 6 is a diagram of coating layers for a coating scheme associated with a lighted portion of the display housing cover 211. A cross section around a cut-out area, such as 280 shown in FIG. 5, is illustrated. The thicknesses of the various layers are not representative and are provided for illustrative purposes only. The display housing cover 211 can be formed from a display housing cover material 272 and can be described as having an outer cosmetic surface 282 and inner surface 281. The illumination source 286 can generate light for illuminating the insert 287.

As previously described, a first coating 283, such as but not limited to a white-colored layer, can be applied to the inner surface of the cosmetic surface 281. Then, a second coating 284, such as but not limited to a gray-colored layer, can be applied on top of the white layer. These coatings can be applied to the edges of the cut-out area, which is bounded by insert 287. In some embodiments, an outer surface of the insert 287, which are visible to a user, can extend above the cosmetic surface 282, can be flush with surface 282, and can be recessed from the surface 282 or combinations thereof. A third coating layer 285 can be applied to layer 284. This layer can be applied to some area around the insert 287, such as 299, shown in FIG. 5. In one embodiment, the third layer can be applied over the insert 287 and an area surrounding the insert 287.

In particular embodiments, the first and second coating layers, 283 and 284, can be applied to the edge of insert 287 as shown in FIG. 6. This configuration produces one lighting effect on the insert as viewed from the outside. In another embodiment, proximate to the insert 287, the third coating 285 layer can cover the edges of the first and/or second coating layers such that these layers are not in contact with the insert 287. For instance, around the edges of the cut-out area, the first and second coating layers can be covered by the third coating layer such that only the third coating layer is in contact with the insert 287.

The colors of the first, second and third coating layers are provided for illustrative purposes and are not limited to the white, gray, white scheme described in the previous paragraphs. In general, a color of the first coating 283 can be selected to maintain or enhance the color or appearance of the display housing material 272. The first coating can maintain or enhance the color or appearance of the display housing material by absorbing or reflecting light that is transmitted through the display housing material from a light source outside of the display housing. The absorption and reflection characteristics of the first coating can be wave-length dependent.

In a particular embodiment, the coating color of the first coating can depend on the color of the display housing material 272. For instance, a white-colored first coating can be used with a display housing material that is mostly white. However, for display housing material of another color, such as blue, a first coating of another color may better maintain or enhance the color of the display housing material, such as a blue colored coating.

The second coating 284 can be selected to control a transmission of light from a light source inside of the display housing and compatibility with the color of the first coating. It is not limited to a gray color and other colored coatings can also be used. The third coating 285 can be selected to control a color and appearance of a lighted portion of the display housing cover, such as a logo, as viewed from the outside of the display housing and can also be selected for compatibility with the other two coating layers. The third coating 285 can act upon light transmitted from a light source outside the display housing and light transmitted from a light source inside the display housing. For instance, the third coating can act upon light transmitted through the insert 287 from a light source outside of the display housing and can act upon light transmitted from a backlight used for the display located inside of the display housing.

The third coating can change the apparent color of the lighted portion of the display housing cover, such as the logo, by absorbing and/or reflecting particular wavelengths of light. For instance, a green colored third coating can be selected to make the color of the lighted portion of the display housing cover appear green. As another example, as described above, the color of the third coating can be selected to remove shadowing effects around the light portion of the display housing cover.

Figure 7:
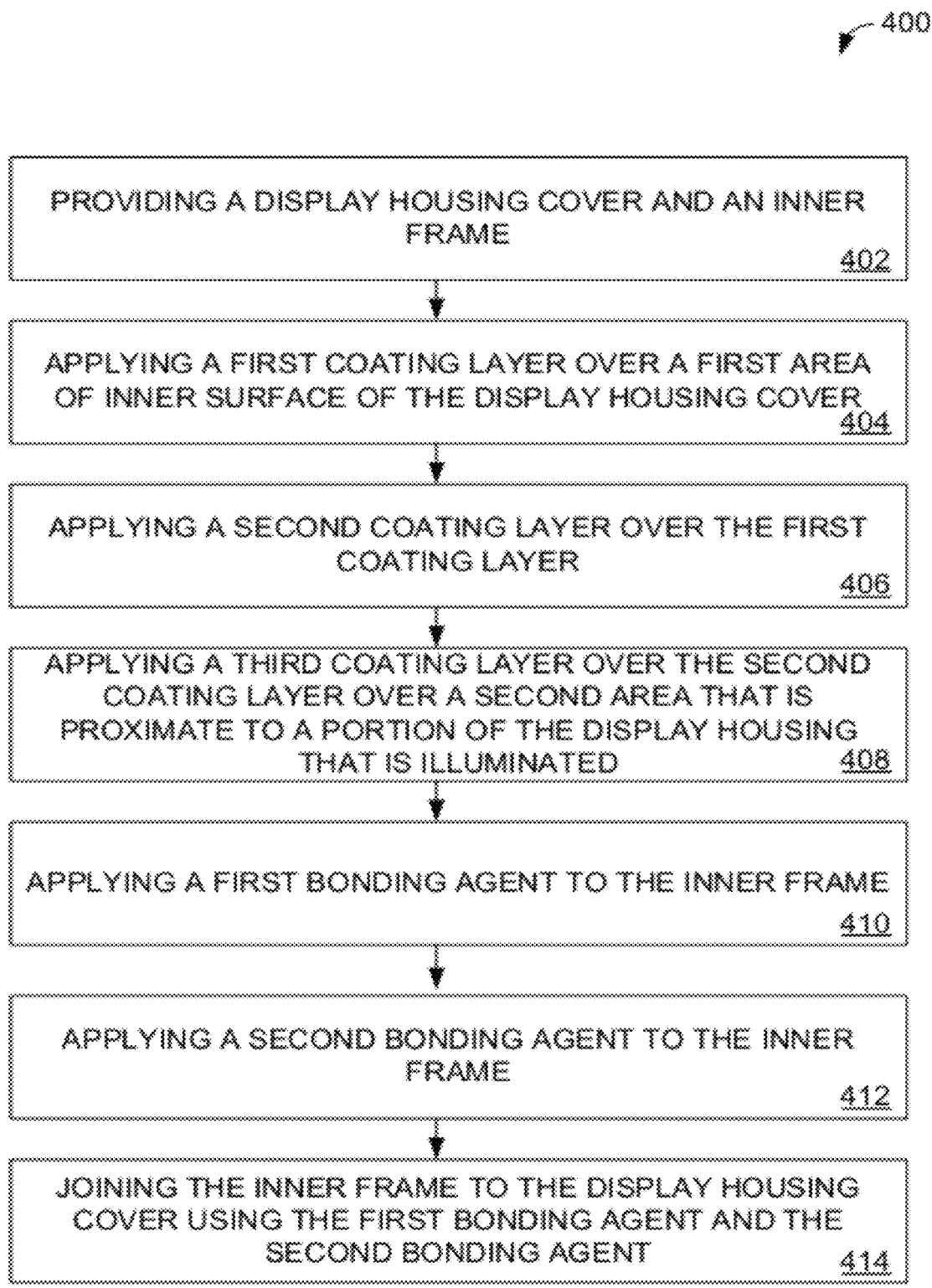
FIG. 7 is a flow chart of a method of assembling a display housing

FIG. 7 is a flow chart of a method of assembling a display housing 400. In 402, a display housing cover and an inner frame can be provided. The display housing cover can be constructed from plastic and the inner frame can be constructed from a metal, such as aluminum, an aluminum alloy, magnesium or a magnesium alloy. The display housing cover can include one or more apertures or holes configured to receive an insert. In particular embodiments, the apertures or holes can be used to provide an illuminated logo.

The display housing cover can be described as having an outer cosmetic surface and an inner surface. The display housing cover can be light transmissive. One or more coating layers can be applied to the inner surface to alter the appearance the cosmetic surface. For instance, the coating layers can absorb or reflect light transmitted through the display housing cover from an illumination source outside of the display housing cover or the coating layers can absorb or reflect light from an illumination source inside of the display housing cover. The absorption and reflection of light by the coating layers can change how the cosmetic outer surface of the display housing cover appears to a person viewing it.

In 404, a first coating layer can be applied over a first area of the display housing cover. In one embodiment, the first coating layer can be a white colored-layer, such as a white colored paint. In 406, a second coating layer can be applied over the first coating layer. In one embodiment, the second coating layer can be a gray colored paint.

In 408, a third coating layer can be applied to the second coating layer. In a particular embodiment, the third coating layer can be applied over an area less than the area where the second coating layer is applied. For instance, the third coating layer can be applied approximate to an area that is to receive illumination from an illumination source located inside of the display housing.

In particular embodiments, the displaying housing cover includes one or more apertures surrounded by a ledge. The ledge can provide a support for an insert that covers the one or apertures. The one or more apertures can be in a shape of a logo. The insert can be illuminated from inside of the display housing cover.

The first two coating layers can be applied up to the edges of the one or more apertures in the display housing cover. Then, after the insert is placed over the one or more apertures, the third coating layer can be applied to a portion of the insert that provides an inner surface of the display housing cover and an area of the second coating layer surrounding the insert.

In one embodiment, in 408, a first bonding agent can be applied to the inner frame. The first bonding agent can be a two part epoxy that is applied in a liquid state. In 410, a second bonding agent can be applied to the inner frame. The second bonding agent can be a very high bond adhesive. The second bonding agent can be provided as a double sided tape. In 412, the inner frame can be joined to the display housing cover using the first bonding agent and the second bonding agent. In other embodiments, the first bonding agent and the second bonding can be applied to the display housing cover and then the inner frame can be joined to the first bonding agent and the second bonding agent. Also, the first bonding agent can be applied to the inner frame and the second bonding agent can be applied to the display housing cover or vice versa and then the two components can be joined together.

The advantages of the invention are numerous. Different aspects, embodiments or implementations may yield one or more of the following advantages. The bonding scheme described herein allows a metallic frame to be coupled to a plastic outer cover in display housing. One advantage of the invention is that undesired bending of the display housing can be prevented during thermal cycling that can occur during operation of a portable computing device including the display housing. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A display housing for a portable computer comprising,
a display housing cover, wherein the display housing cover comprises a hinged side and a free side and wherein proximate to corners of the free side, the display housing cover is joined to the inner frame using the second bonding agent wherein the second bonding agent is a very high bond adhesive;
an inner frame bonded to the display housing cover for providing structural stiffness to the display housing cover,
a first bonding agent for bonding the display cover to the inner frame,
a second bonding agent for bonding the display cover to the inner frame, wherein the second bonding agent is for preventing bond slippage in a bond between the inner frame and the display housing cover formed using the first bonding agent during thermal cycling of the display housing.

2. The display housing of claim 1, wherein the first bonding agent is applied as a liquid during initial bonding of the metallic frame to the display housing cover and subsequently hardens to establish the bond between the inner frame and the display housing cover.

3. The display housing of claim 2, wherein the bond is established at a first temperature and wherein first bonding agent softens such that a strength of the bond decreases at temperatures above the first temperature.

4. The display housing of claim 1, wherein a thermal expansion coefficient of the display housing cover is greater than the thermal expansion coefficient of the inner frame.

5. The display housing of claim 1, wherein the inner frame comprises magnesium.

6. The display housing of claim 1, wherein the display housing cover comprises plastic.

7. The display housing of claim 1, wherein the second bonding agent comprises a very high bond adhesive.

8. The display housing of claim 1, wherein the first bonding agent is a liquid two part epoxy during application.

9. The display housing of claim 1, wherein the second bonding agent comprises a double sided tape with very bond adhesive on each side of the tape.

10. The display housing of claim 1, wherein the display housing cover comprises a hinged side and a free side wherein proximate to each end of the free side, the inner frame is joined to the display housing cover using the second bonding agent and proximate to a center of the free side the inner frame is joined to display housing cover using the first bonding agent.

11. The display housing of claim 1, wherein the display housing cover comprises a hinged side and a free side and two adjacent sides connecting the hinged side and the free side wherein, for each of the two adjacent sides, on a first end proximate to the hinged side, the first bonding agent is used to join the inner frame to the display housing cover and on a second end proximate to the free side, the second bonding agent is used to join the inner frame to the display housing cover.

12. The display housing of claim 1, wherein a portion of an outer surface of the display housing cover is illuminated from a light source located within the display housing cover.

13. The display housing of claim 1, wherein the light source comprises one or more LED elements.

14. The display housing of claim 1, further comprising a display enclosed within the display housing wherein the display is backlit using one or more LED elements.

15. The display housing of claim 1, wherein an inner surface of the display housing cover comprises: 1) a first coating layer applied over a first area of the inner surface of the display housing cover; 2) a second coating layer applied over the first coating layer; and 3) a third coating layer over the second coating layer over a second area less than the first area, said second area surrounding a portion of display housing cover that is illuminated from an illumination source enclosed within the display housing.

16. The display housing of claim 1, further comprising one or more magnets for latching the display housing to a body of a portable computer housing wherein the display housing and the body are coupled together to provide the portable computer housing.

17. A display housing for a portable computer comprising,
a display;
a display housing cover that encloses at least a back side of the display;
an illumination source deposed between the backside of the display and the display housing cover comprising one or more LED elements;
an inner frame bonded to the display housing cover for providing structural stiffness to the display housing cover,
a first bonding agent for bonding the display cover to the inner frame wherein the first bonding agent is applied as a liquid that subsequently hardens to form a bond between the inner frame and the display housing cover,
a second bonding agent for bonding the display cover to the inner frame, wherein the second bonding agent is for preventing bond slippage in the bond between the inner frame and the display housing cover formed during thermal cycling of the display housing.

18. A method comprising,
providing a display housing cover and an inner frame for a display housing wherein the display housing cover comprises a hinged side and a free side wherein proximate to each end of the free side;
applying a first bonding agent to a first portion of the inner frame wherein the first bonding agent is applied as a liquid;
applying a second bonding agent to a second portion the inner frame proximate to each end of the free side wherein the second bonding agent is a very high bond adhesive; and
joining the inner frame to the display housing cover using the first bonding agent and the second bonding agent wherein the second bonding agent is for preventing bond slippage in a bond between the inner frame and the display housing cover formed using the first bonding agent during thermal cycling of the display housing.

19. The method of claim 18, further comprising:
applying a first coating layer over a first area of an inner surface of the display housing cover;
applying a second coating layer over the first coating layer;
applying a third coating layer over the second coating layer over a second area less than the first area, said second area surrounding a portion of display housing cover that is illuminated from an illumination source enclosed within the display housing.

20. A method comprising,
providing a display housing cover and an inner frame for a display housing;

applying a first coating layer over a first area of an inner surface of the display housing cover;
applying a second coating layer over the first coating layer;
applying a third coating layer over the second coating layer over a second area less than the first area, said second area surrounding a portion of display housing cover that is illuminated from an illumination source enclosed within the display housing;

applying a first bonding agent to the inner frame;
applying a second bonding agent to the inner frame; and
after applying at least the first coating layer and the second coating layer, joining the inner frame to the display housing cover using the first bonding agent and the second bonding agent.

* * * * *